United States Patent [19]

Nourrcier

[11] Patent Number: 5,298,962
[45] Date of Patent: Mar. 29, 1994

[54] PULSE COMPRESSION SIGNAL PROCESSOR UTILIZING IDENTICAL SAW MATCHED FILTERS FOR BOTH UP AND DOWN CHIRPS

[75] Inventor: Charles E. Nourrcier, Lakewood, Calif.

[73] Assignee: Hughes Aircraft Company, Los Angeles, Calif.

[21] Appl. No.: 971,793

[22] Filed: Nov. 5, 1992

[51] Int. Cl.⁵ .............................................. G01C 3/08
[52] U.S. Cl. ...................................... 356/5; 342/132; 367/102
[58] Field of Search ........................... 356/5; 342/132; 367/101, 102

[56] References Cited

U.S. PATENT DOCUMENTS 4,245,333 1/1981 Jelks ...................................... 367/121
4,333,080 6/1982 Collins et al. ....................... 342/194

Primary Examiner—Stephen C. Buczinski
Attorney, Agent, or Firm—Michael W. Sales; Wanda K. Denson-Low

[57] ABSTRACT

A pulse compression signal processor (10) for a laser radar system which utilizes substantially identical negative slope SAW matched filters (30,44) for compressing both the up and down chirps of a bi-directional echo signal (14). The signal processor (10) receives the echo (14) and splits it into two signals (16, 18) for processing by separate negative slope SAW matched filters (30, 44).

14 Claims, 2 Drawing Sheets

PULSE COMPRESSION SIGNAL PROCESSOR UTILIZING IDENTICAL SAW MATCHED FILTERS FOR BOTH UP AND DOWN CHIRPS

BACKGROUND OF THE INVENTION

1. Field of Invention

This invention relates generally to FM "chirped" laser radar systems and, more particularly, to a pulse compression signal processor which utilizes identical sound acoustic wave (SAW) matched filters for processing both the up and down chirps of a bi-directional linear FM echo signal.

2. Discussion

Laser radar systems which employ an intensely focused beam of light to detect the presence, position and motion of objects have been used in numerous applications, especially in the radar communications and measurement fields. Militarily, these systems have been implemented in conjunction with cruise missile and tactical fighter technology wherein laser radar has provided functions such as obstacle avoidance and terrain following. These laser radar systems enable sophisticated target homing capabilities for accurately guiding a missile or plane toward a target by utilizing a distinguishing feature of that target.

Linear frequency modulated (LFM) "chirped" laser radar has proven to be particularly useful in these applications. A "chirped" laser radar system typically includes a continuous wave (CW) transmitter which emits laser light at a preselected center frequency $f_c$. This emitted light is frequency modulated into linear "chirps" by passing it through an electro-optical device disposed within the cavity of the transmitter. The shape of modulated waveform can be varied somewhat in order to optimize trade-offs in efficiency, complexity and performance.

A bi-directional type of waveform, as shown in FIG. 1, is often used to minimize range/doppler ambiguity in the system as well as to maximize the system's ambiguous range. To create this waveform, the frequency of each transmitted pulse is first increased and then decreased at a constant rate. The frequency variation created is preferably linear and the frequency versus time characteristic of the signal is typically of a trapezoid pattern as shown by the solid line in FIG. 1. Each chirp in the signal includes an "up chirp" component wherein frequency is increasing and a "down chirp" component wherein the frequency is decreasing.

The transmitted chirped signal is directed toward a target and then reflected back therefrom, creating a return signal or "echo" associated with the target. The time taken by the transmitted signal to reach the target and return causes the return signal to be displaced in time with respect to the transmitted signal. The echo signal naturally retains the same increases and decreases in frequency it had as a transmitted signal. This is shown graphically in FIG. 1 wherein the solid line represents a transmitted signal Tx and the dashed line is used to indicate a corresponding return signal Rx. As illustrated in FIG. 1, both the transmitted and return signals have an up chirp where frequency is steadily increasing and a corresponding down chirp where frequency decreases.

The instantaneous frequency difference between the transmitted and return signals is indicated in FIG. 1 as $f_o$. To obtain this frequency difference, the return signal may be compared to a reference signal which is typically a sample of the transmitted signal created by using a beamsplitter to retain a small portion of the transmitted beam. Properly scaled, this instantaneous frequency difference $f_o$ can be used to "demodulate" the return signal in order to ascertain certain information about the target and its location.

To obtain both long range detection capabilities and fine range resolution, extremely narrow pulses of exceptionally high peak power need to be transmitted. But, because there exist practical limitations on the level of peak power used, the laser radar system typically utilizes a relatively long coded pulse as the transmitted signal and then takes advantage of pulse compression of the return signal to obtain a narrower pulse. This enables achievement of the increased detection ability of a long pulse radar system while also retaining the range resolution capability of a narrow pulse system. Transmission of long pulses also permits a more efficient use of the average power capability of the radar without generating high peak power signals.

Pulse compression allows the transmission of modulated pulses of sufficient width to provide the average power necessary to illuminate targets, at a reasonable level of peak power. The received echoes are then compressed by decoding their modulation to obtain the range accuracy and resolution equivalent to that of a short pulse. This is accomplished by increasing the transmitted signal bandwidth by modulating the frequency of the carrier within the transmitted pulse. With a matched filter, the received long pulse can be compressed to a short pulse of duration equal to the inverse of the transmitted signal bandwidth.

The various methods of pulse compression are essentially matched filtering schemes in which the transmitted pulses are coded and the received pulses are passed through a filter whose time-frequency characteristic is the conjugate (opposite) of the coding. This function is usually performed within the signal processor used to process the received echo.

The matched filter introduces into the signal a time lag that is inversely proportional to frequency. As illustrated in FIG. 2, a filter for compressing an up chirp has a signal transit time which decreases linearly with increasing frequency, at exactly the same rate as the frequency of the echo increases. The trailing portions of an up chirp echo, being of a progressively higher frequency, take less time to pass through than the lower frequency leading portions, thereby causing successive portions to bunch together or compress. When a pulse has been compressed by the filter, its amplitude is much greater and its width is much less than when it entered. While the output echo may be only a fraction of the width of the received echo, it can have many times the peak power.

In laser radar systems this pulse compression is typically performed with a surface acoustic wave (SAW) device used as a matched filter. The signal transit time may either decrease with frequency as shown in FIG. 2, to compress an up chirp, or else increase with frequency for compressing a down chirp. A filter of the type shown in FIG. 2 is often referred to as a negative slope device and a filter having an opposite configuration in which frequency increases with transit time is referred to as a positive slope device.

In previous laser radar systems, individual SAW matched filters were uniquely developed for processing each of the up and down pulses of a bi-directional echo signal. A positive slope SAW matched filter was used to compress the down chirp and a negative slope SAW matched filter was used to compress the up chirp.

However, SAW devices have a bulk mode problem with long delays which is aggravated with high frequencies. In a positive slope device, the higher frequencies take the longer delay through the filter. The bulk mode problems generate spurious signals difficult to eliminate by filtering. The output is also often preceded and followed by sidelobes, an undesirable series of lesser pulses.

There is, therefore, a need for a LFM chirp laser radar signal processor which substantially reduces these problems and is able to compress both the up and down chirps with improved performance.

SUMMARY OF THE INVENTION

The signal processor of the present invention substantially reduces these problems by eliminating the positive slope SAW matched filter used in conventional systems and replacing it with a negative slope SAW matched filter. The signal processor receives a bi-directional LFM echo and splits it into two signals which are then processed separately, these separate signals each being mixed with a local oscillator signal to generate a first resulting signal and a second resulting signal. From the first resulting signal, the upper sideband is extracted and compressed with a negative slope SAW filter. From the second resulting signal, the lower sideband is extracted and also compressed using a negative slope SAW filter. This allows both chirps to be processed with a higher performance negative slope filter, substantially eliminating problems inherent in a conventional system which also employs a lower performance positive slope filter.

Additional objects, advantages, and features of the present invention will become apparent from the following description and appended claims, taken in conjunction with the accompanying drawings.

DESCRIPTION OF THE PREFERRED EMBODIMENT

Figure 3:
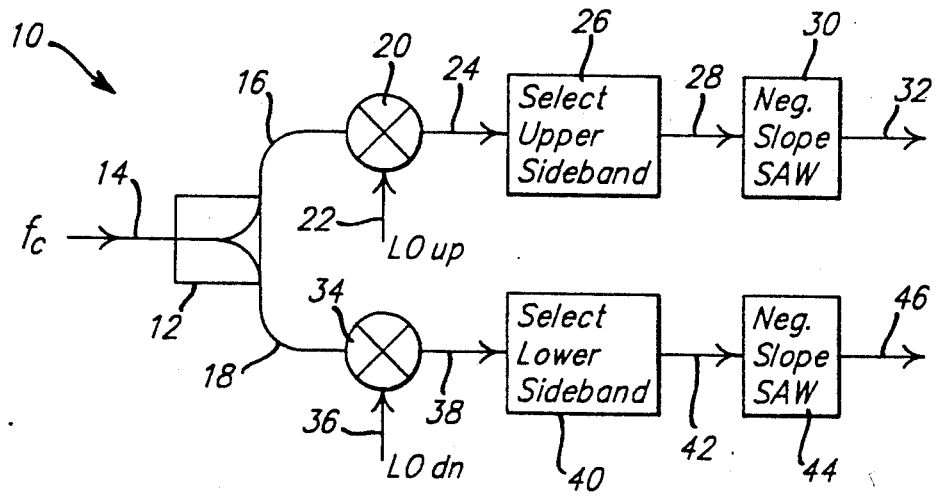
FIG. 3 is a block diagram of the pulse compression signal processor according to the teachings of the present invention.

Referring now to the drawings, in particular FIG. 3, a pulse compression signal processor according to the teachings of the present invention is indicated generally at 10. Signal processor 10 is best suited for use in an LFM chirped laser radar system utilizing a bi-directionally modulated beam, but may be used in any other suitable system.

Figure 1:
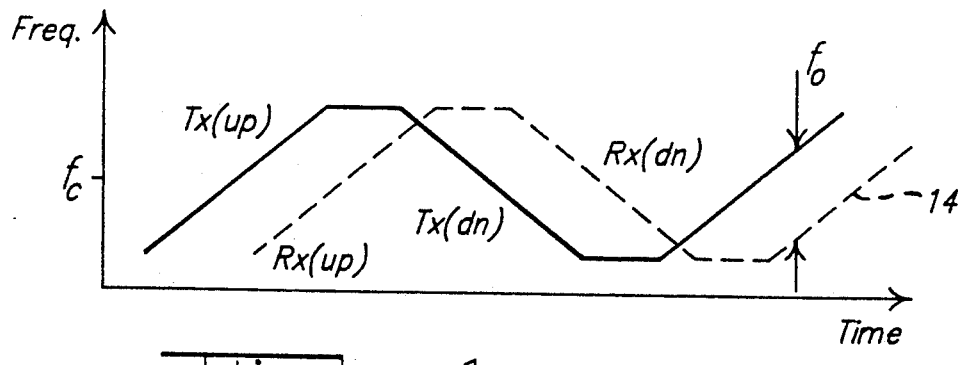
FIG. 1 is a graphic illustration of the frequency versus time characteristics of a transmitted bi-directional LFM chirp signal (solid line) and a corresponding return (dashed line) signal.
Figure 2:
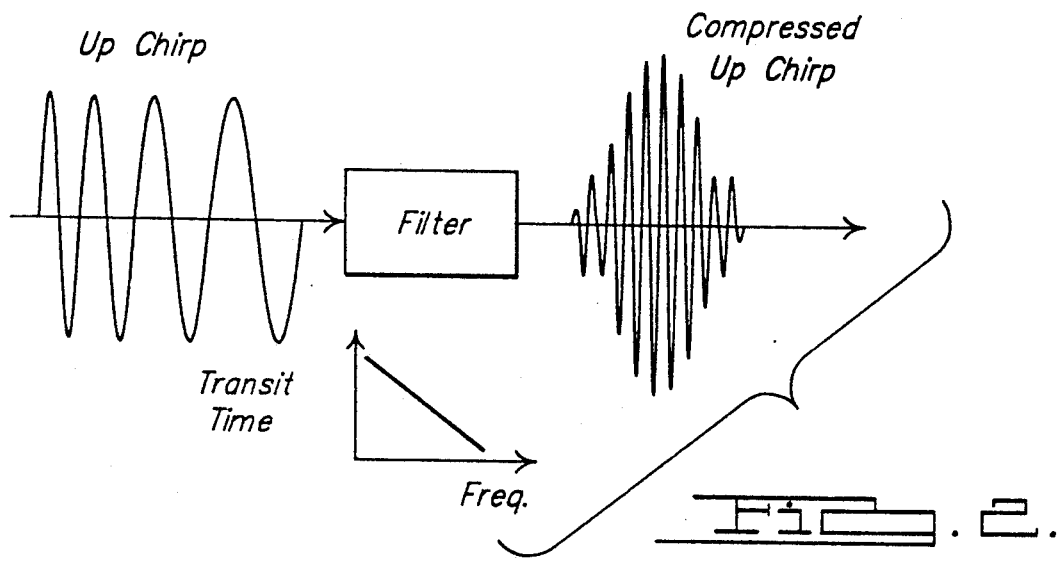
FIG. 2 illustrates pulse compression of an up chirp.

Processor 10 includes a power splitter 12 which receives an input signal 14, preferably a bi-directional return echo signal containing both up and down chirps having a preselected center frequency $f_c$. The signal 14 has preferably been modulated in a trapezoidal fashion where frequency has been increased and decreased linearly as shown in FIG. 1. The splitter 12 splits the received echo 14 into two separate but like signals, 16 and 18, respectively.

Figure 4:
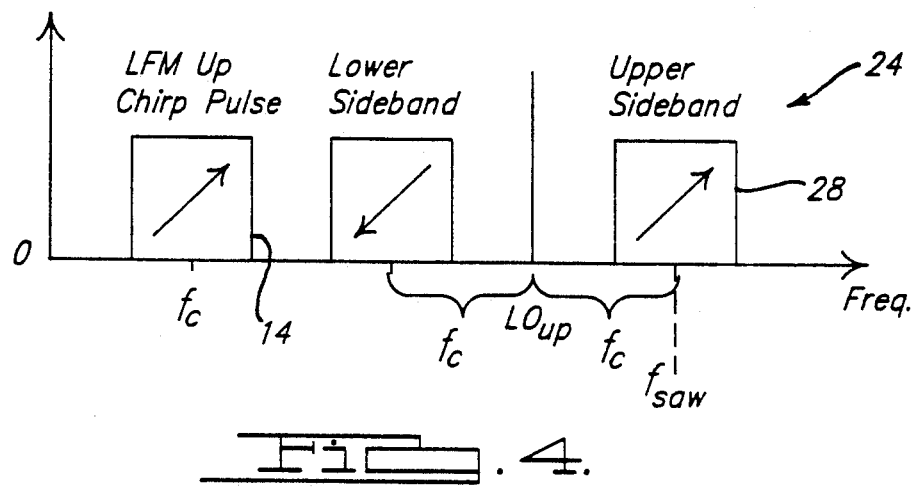
FIG. 4 shows graphically the output of the first mixer of the signal processor shown in FIG. 3.

The first of these signals, signal 16 is combined in an electronic mixer 20 with a local oscillator (LO) signal 22 which is preferably a single tone sinewave at a first fixed frequency above $f_c$, designated herein as $LO_{up}$. The output of mixer 20 is a signal 24 centered about the frequency of local oscillator signal 22, $LO_{up}$, having two sidebands, a lower sideband centered about a frequency of $LO_{up}-f_c$ and an upper sideband centered about a frequency of $LO_{up}+f_c$. These sidebands are the result of sum and difference signals created by mixer 20, the difference signal creating the lower sideband and the sum signal resulting in the upper sideband. This output signal 24 of mixer 20 is illustrated graphically in FIG. 4.

The upper sideband 28 of signal 24 is selected such as by a bandpass filter 26. The upper sideband signal 28 is then passed through a negative slope filter 30, preferably a SAW matched filter, which outputs the compressed up chirp signal component 32 of return echo 14 as described above. The function of bandpass filter 26, however, is preferably integrated into SAW filter 30 by choosing the frequency $LO_{up}$ of local oscillator signal 22 such that the upper sideband signal 28 falls within the passband of the SAW matched filter, which is centered about a frequency $f_{saw}$ (i.e., such that $LO_{up}+f_c=f_{saw}$). This eliminates the need for a separate bandpass filter 26.

Figure 5:
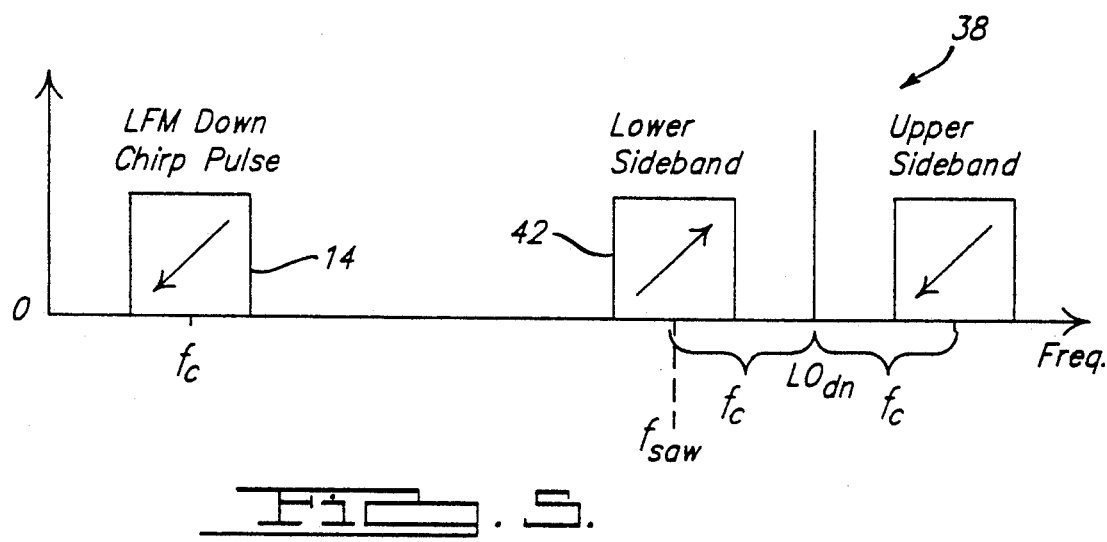
FIG. 5 shows graphically the output of the second mixer of the signal processor shown in FIG. 3.

In a similar fashion, signal 18 is mixed in electronic mixer 34 with a local oscillator signal 36, preferably a single tone sinewave at a fixed frequency $LO_{dn}$, preferably above $LO_{up}$. This creates a signal 38 centered about the frequency of local oscillator signal 36, $LO_{dn}$, having a lower sideband 42 centered about a frequency of $LO_{dn}-f_c$ and an upper sidebnd centered about a frequency of $LO_{dn}+f_c$, these sidebands also the result of the mixing process. This output signal 38 of mixer 34 is illustrated graphically in FIG. 5.

The lower sideband 42 may be selected from signal 38 by a bandpass filter 40. However, by choosing the center frequency $f_{saw}$ of the SAW filter 44 such that the lower sideband 42 falls within its passband, the need for a separate bandpass filter 40 can be eliminated. Lower sideband signal 42 is then processed through a negative slope SAW matched filter 44 which outputs the compressed down chirp signal component 46 of return echo 14.

Processing of the lower sideband signal 42, representative of the down chirp component of the return echo signal 14, can be accomplished with a negative slope SAW filter, rather than a conventional positive slope filter, because the electronic mixing process reverses the slope of the lower sideband signal 42. By multiplying LO signal 36 with the received LFM pulse 14 to generating sum and difference signals, the chirp direction of the lower sideband is in the opposite direction of the chirp in the input signal. Because the frequency about which the lower sideband is centered is equal to $Lo_{dn}-f_c$, when the return signal is increasing in frequency the difference signal will decrease in frequency and when the return signal decreases in frequency the difference signal increases. The sum signal (upper sideband) does not change direction. The lower sideband of the down chirp, therefore, is increasing in frequency like an up chirp and may be compressed by a negative slope matched filter 44. This is shown best in FIGS. 4 and 5.

The devices and method used to process the two separate signals 16 and 18 derived from return echo 14 are preferably identical except for the local oscillator signals 27 and 36 applied to the respective mixers 20 and 34. Since the SAW matched filters 30 and 44 may act as bandpass filters, the proper sideband selection may be accomplished by varying only the local oscillator signals applied to each mixer. The frequency of each local oscillator signal is preferably chosen such that the proper sideband falls into the passband of both SAW filters 30 and 44 (i.e., $f_{saw} = LO_{up} + f_c = LO_{dn} - f_c = LO_{dn} - f_c$ or $LO_{up} = f_c$ and $LO_{dn} = f_{saw} + f_c$). This eliminates the need for separate electronic bandpass filters and provides for the use of substantially identical negative slope SAW matched filters, both centered about the same frequency $f_{saw}$.

By using negative slope filters for pulse compression of both the up and down LFM pulses, the sidelobe or time spurious response is improved and it is easier to match the slopes and weighting of the matched filters, thereby making it easier to balance the channels. Negative slope filters are easier to manufacture and have higher performance and better sidelobe rejection than a positive slope filter. Production costs are reduced since only one type of filter (rather than two) needs to be stocked. The non-recurring engineering cost is cut in half as well and cost reductions can be further enhanced by increased volume buying. Finally, only one test fixture is needed as well as only one test procedure.

While the present invention has been described in connection with the presently preferred embodiment, one skilled in the art will readily recognize that various changes and modifications can be made thereto without departing from the spirit and scope of the invention as set forth in the appended claims.

What is claimed is:

1. A pulse compression signal processor for processing a received chirped laser radar return echo signal wherein said echo is centered about a center frequency and has an up chirp component and a down chirp component comprising:
   (a) means for splitting said received return echo into a first signal and a second signal;
   (b) means for processing said first signal including mixing said first signal with a first local oscillator signal to produce a first resulting signal, extracting an upper sideband component from said first resulting signal and compressing said upper sideband component using a first negative slope matched filter to produce a compressed up chirp component of the received return echo signal; and
   (c) means for processing said second signal including mixing said second signal with a second local oscillator signal to produce a second resulting signal, extracting a lower sideband component from said second resulting signal and compressing said lower sideband component using a second negative slope matched filter to produce a compressed down chirp component of the received return echo signal.

2. The signal processor of claim 1 wherein said first and second negative slope matched filters are substantially identical.

3. The signal processor of claim 1 wherein said first and second negative slope matched filters are surface acoustic wave (SAW) filters.

4. The signal processor of claim 1 wherein said first local oscillator signal is a single tone sinewave at a fixed frequency.

5. The signal processor of claim 4 wherein the frequency of said first local oscillator signal is above the center frequency of said return echo.

6. The signal processor of claim 5 wherein said second local oscillator signal is a single tone sinewave at a fixed frequency and wherein said frequency of said second local oscillator signal is above the frequency of said first local oscillator signal.

7. The signal processor of claim 5 wherein said first negative slope matched filter has a first passband and the frequency of said first local oscillator signal is chosen such that said upper sideband falls substantially within said first passband.

8. The signal processor of claim 7 wherein said second negative slope matched filter has a second passband and the frequency of said second local oscillator signal is chosen such that said lower sideband falls substantially within said second passband.

9. The signal processor of claim 8 wherein the respective passbands of each of said first and second negative slope matched filters are substantially identical.

10. A method for processing a received chirped laser radar return echo signal wherein said echo has an up chirp component and a down chirp component comprising the steps of:
   (a) splitting said received return echo signal into a first signal and a second signal;
   (b) mixing said first signal with a first local oscillator signal to produce a first resulting signal having an upper sideband and a lower sideband;
   (c) extracting said upper sideband from said first resulting signal and compressing said upper sideband with a first negative slope SAW matched filter to produce a compressed up chirp component of the received return echo signal;
   (d) mixing said second signal with a second local oscillator signal to produce a second resulting signal having an upper sideband and a lower sideband; and
   (e) extracting said lower sideband from said second resulting signal and compressing said lower sideband with a second negative slope SAW matched filter substantially identical to said first negative slope SAW matched filter to produce a compressed down chirp component of the received return echo signal.

11. The method of claim 10 wherein said upper sideband of said first resulting signal is extracted with a bandpass filter.

12. The method of claim 10 wherein said upper sideband of said first resulting signal is extracted by said first negative slope SAW matched filter.

13. The method of claim 10 wherein said lower sideband of said second resulting signal is extracted with a bandpass filter.

14. The method of claim 10 wherein said lower sideband of said second resulting signal is extracted by said second negative slope SAW matched filter.

* * * * *